Oct. 17, 1933.  A. G. SCHURMAN  1,930,625
CAPPING MACHINE
Filed June 6, 1930  8 Sheets-Sheet 1
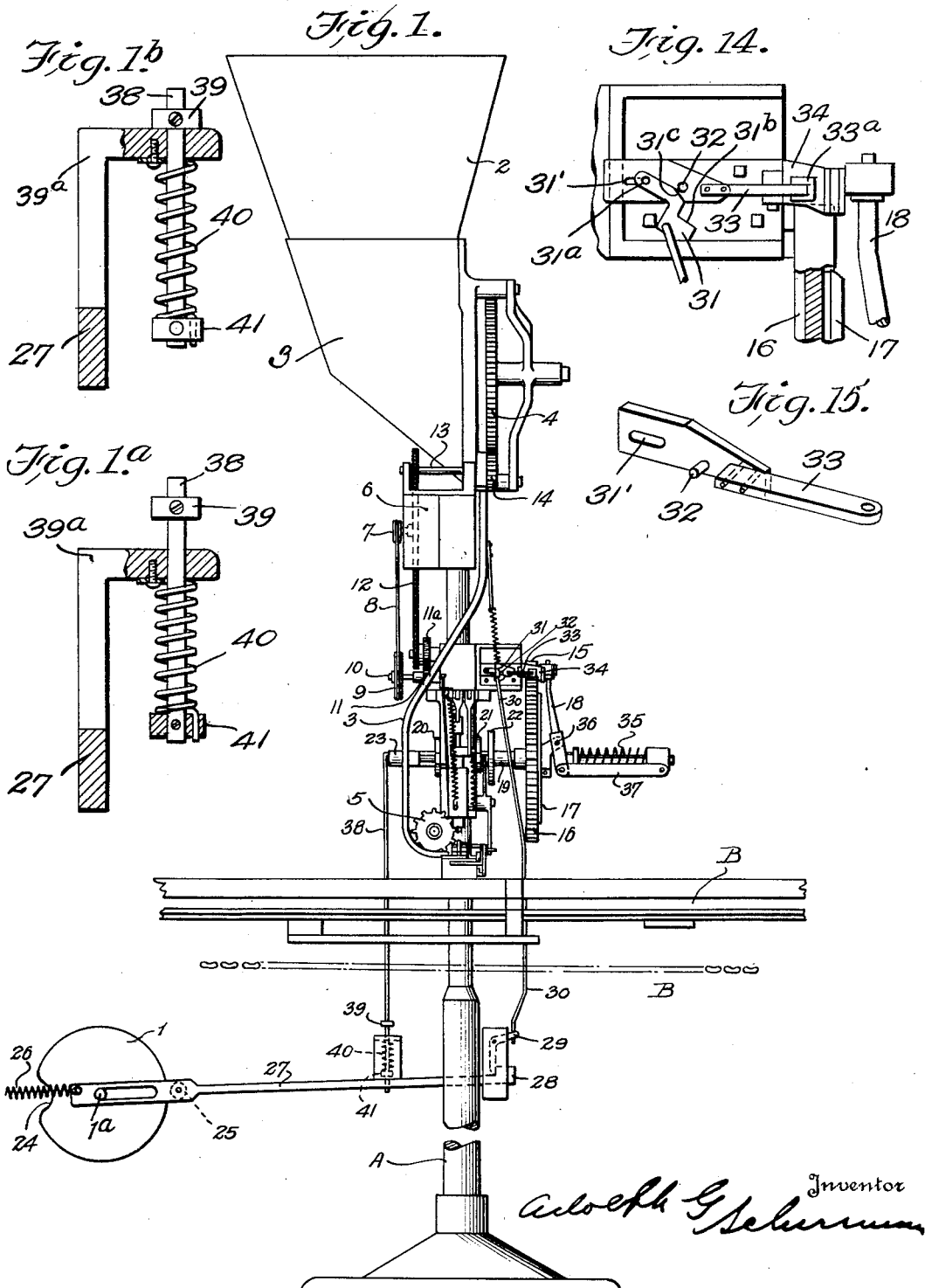

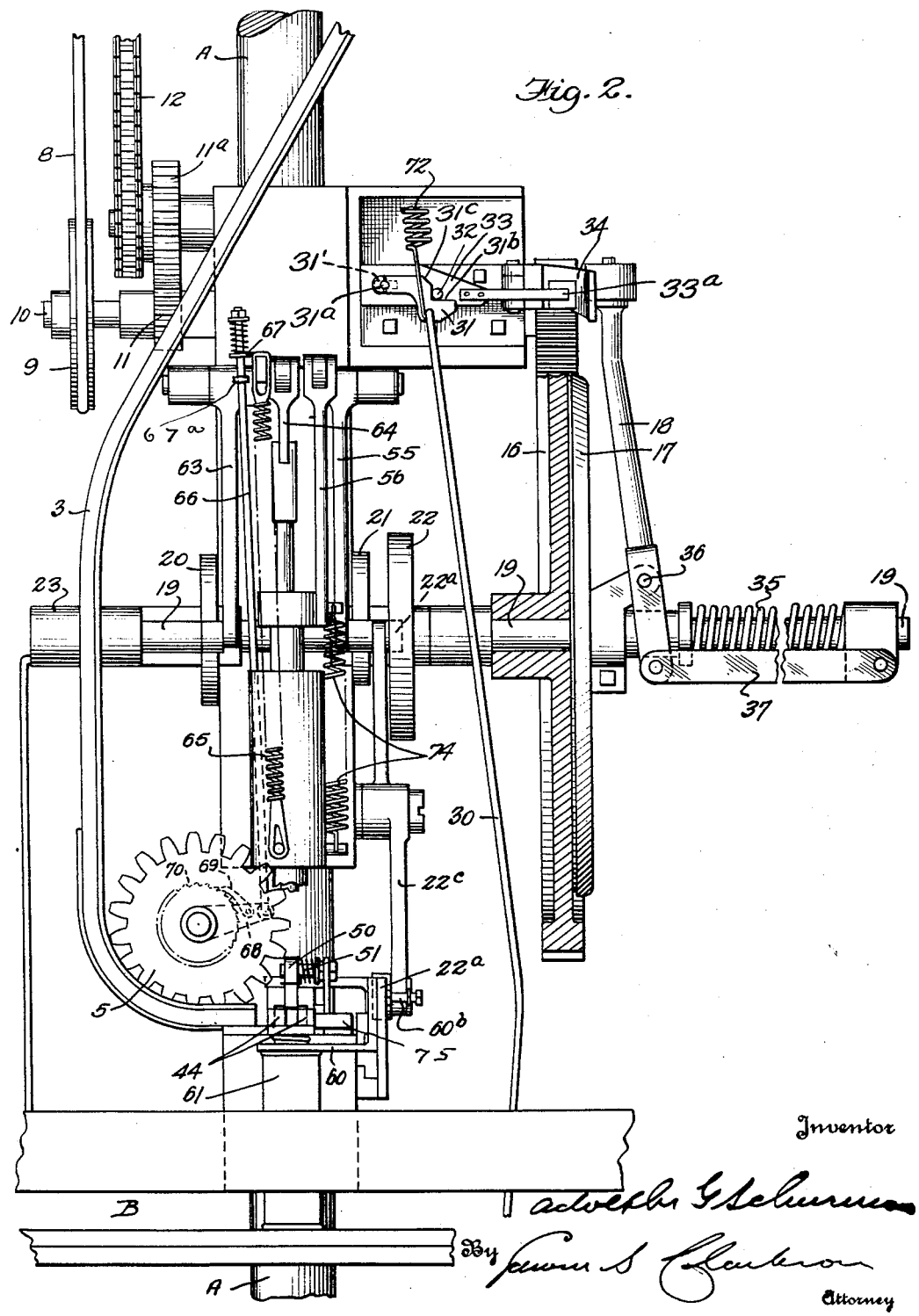

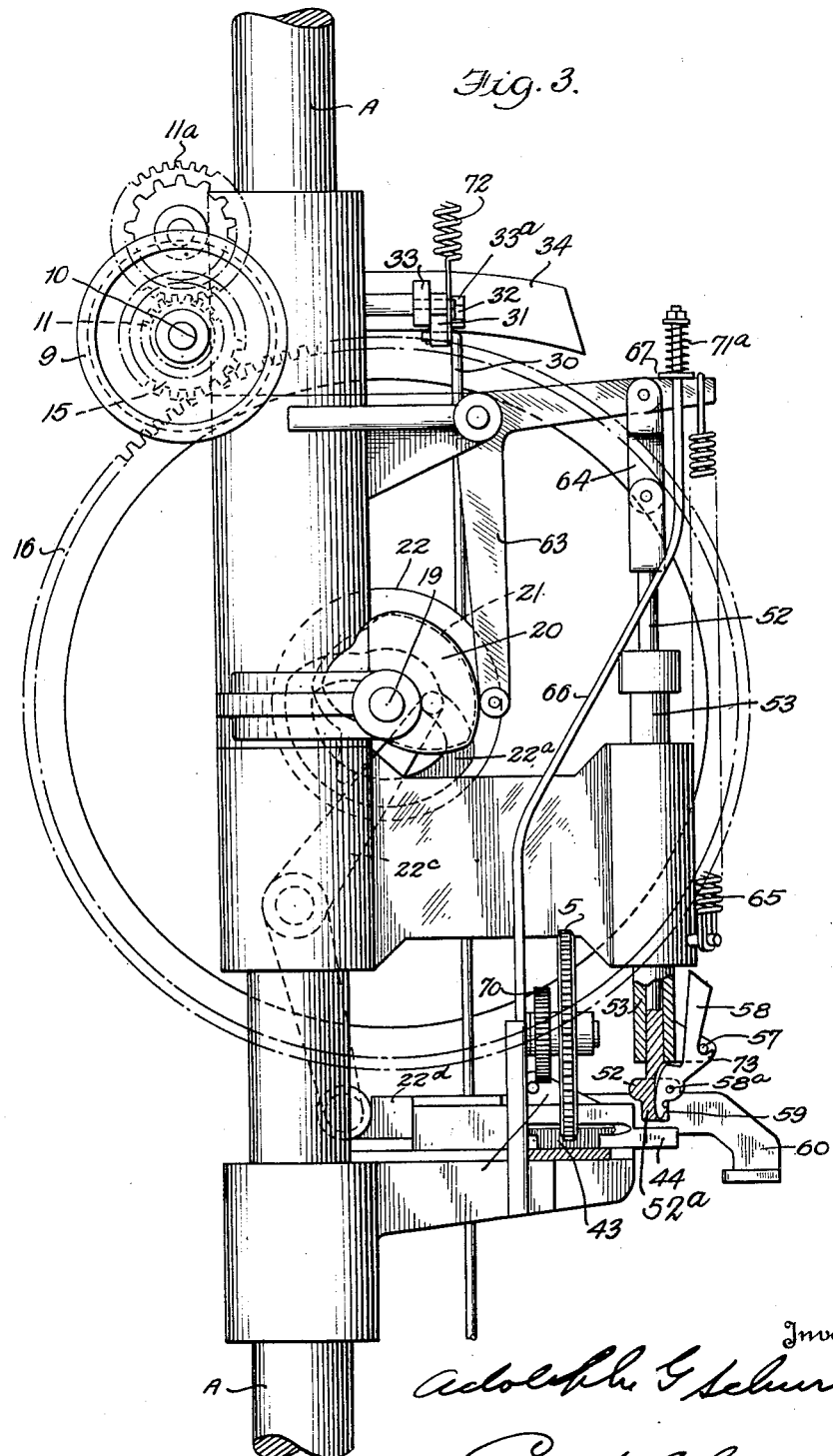

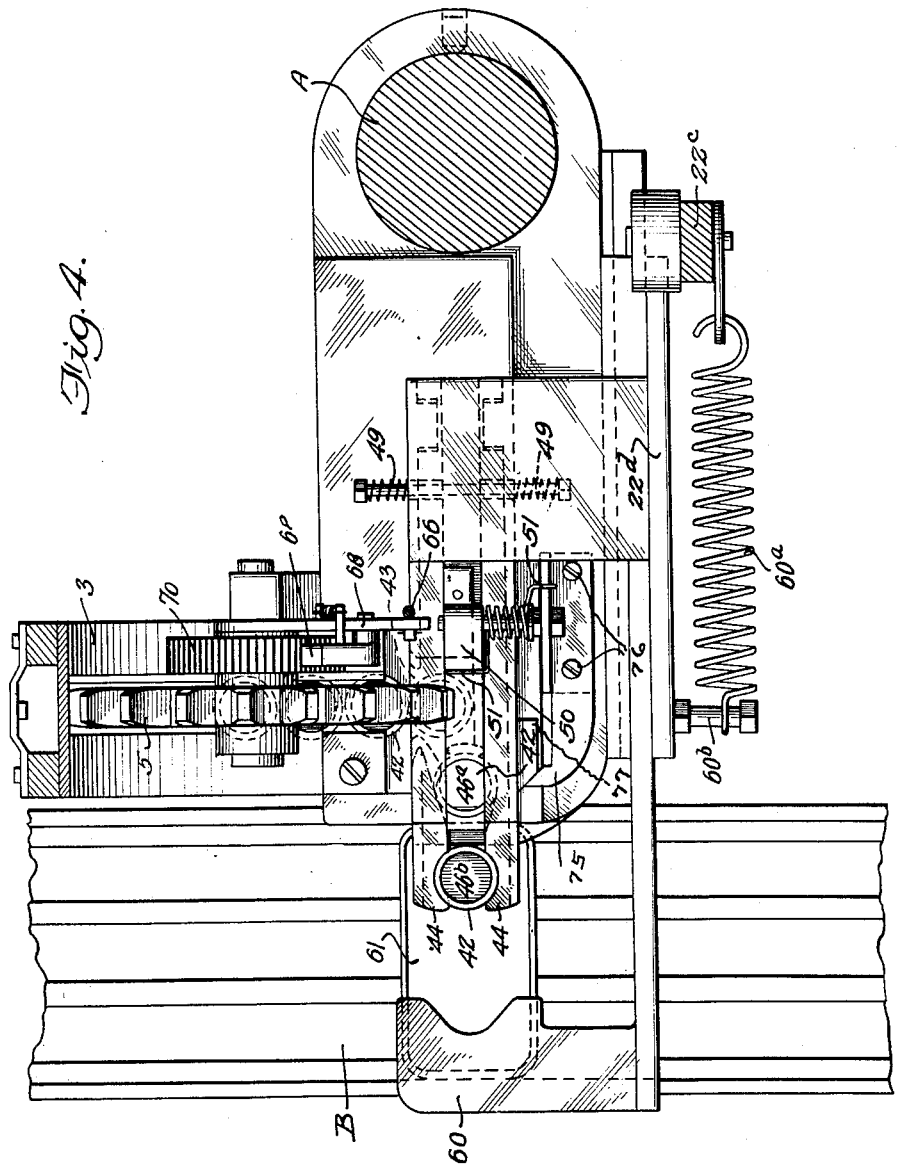

Oct. 17, 1933.   A. G. SCHURMAN   1,930,625
CAPPING MACHINE
Filed June 6, 1930   8 Sheets-Sheet 5
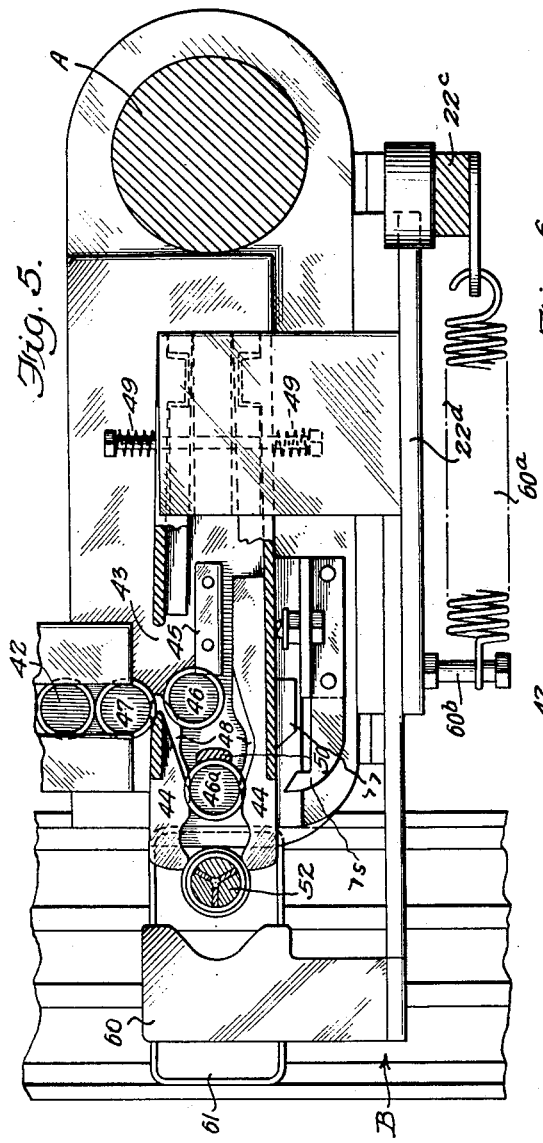
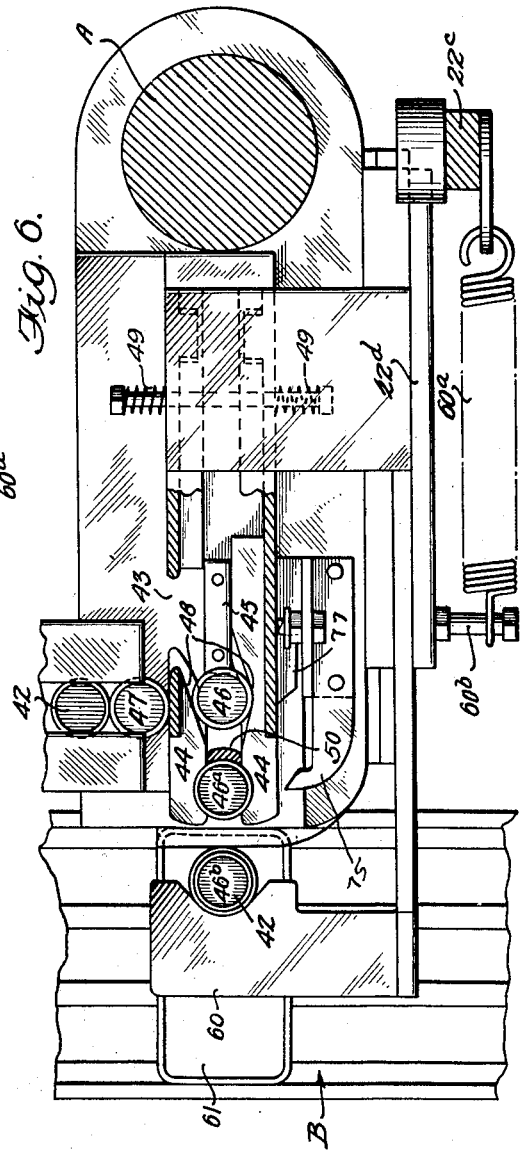

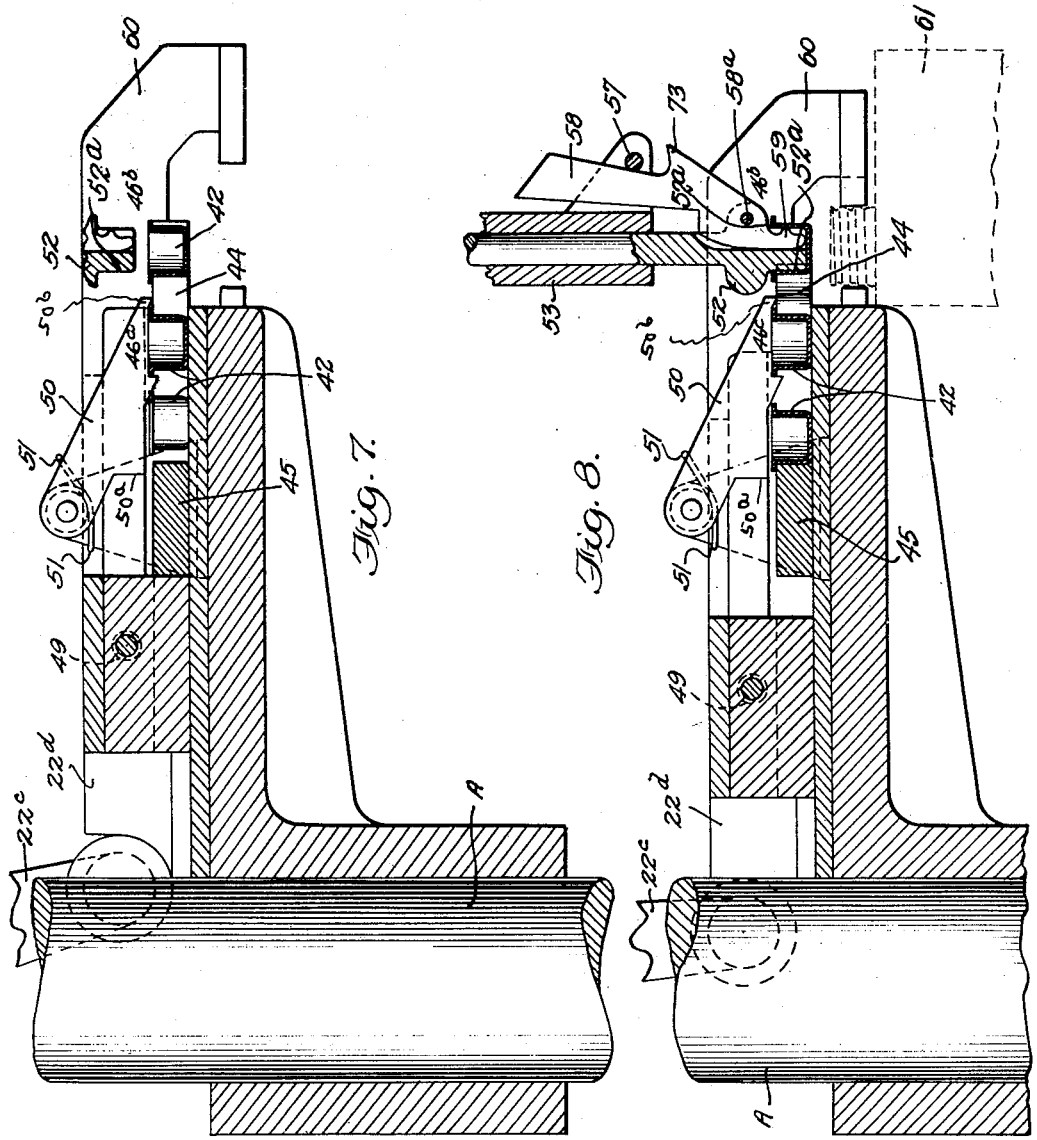

Oct. 17, 1933.  A. G. SCHURMAN  1,930,625
CAPPING MACHINE
Filed June 6, 1930  8 Sheets-Sheet 7

Inventor
Adolph G. Schurman
By Schurman & Clarkson
Attorney

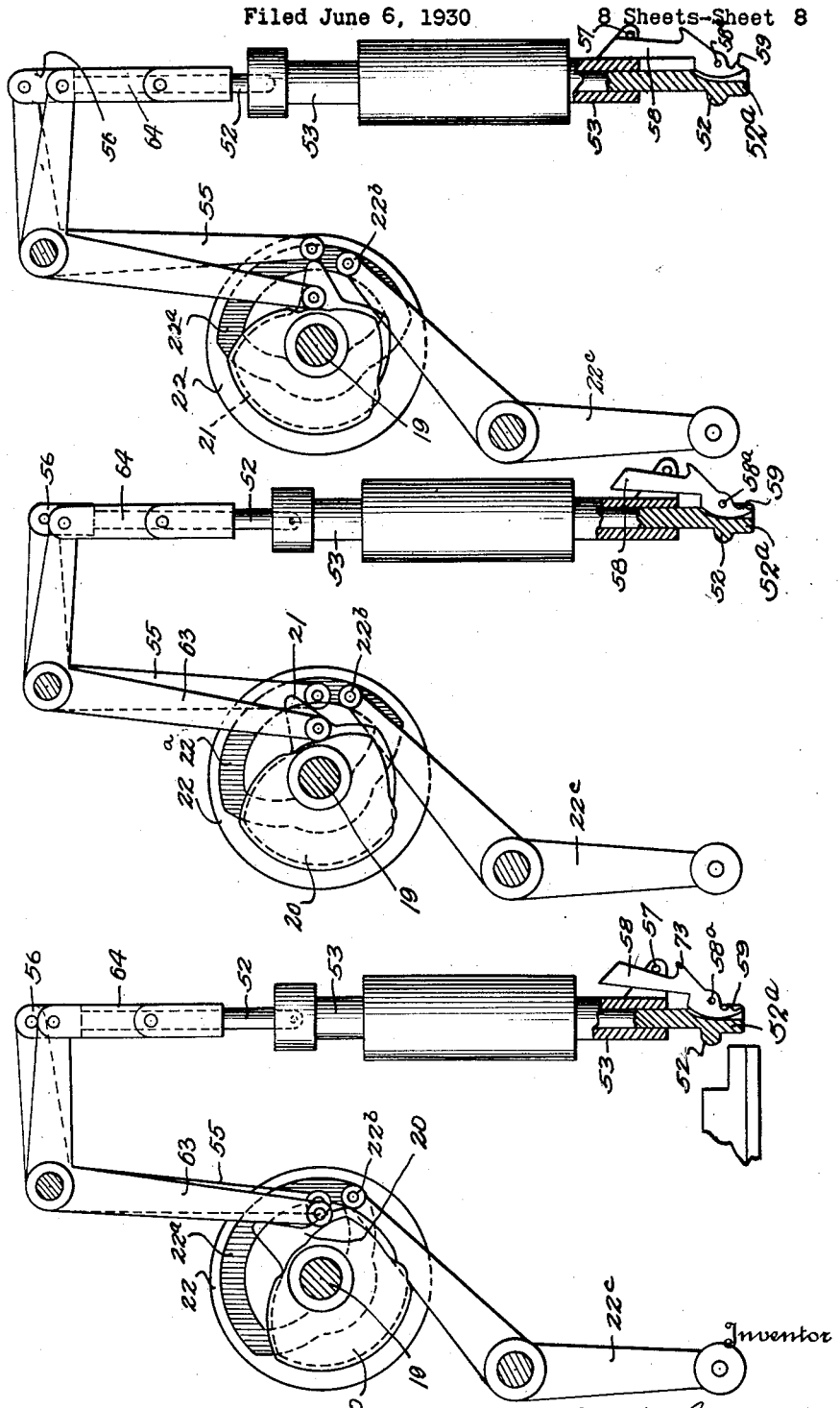

Patented Oct. 17, 1933

1,930,625

UNITED STATES PATENT OFFICE 1,930,625

CAPPING MACHINE

Adolph G. Schurman, Baltimore, Md.

Application June 6, 1930. Serial No. 459,508

20 Claims. (Cl. 113—14)

It is known that some dealers in order to increase their profits adulterate an original product which results in reducing the efficiency of the product, and consequently the reputation of the original product is gradually lost.

Manufacturers wishing to guard against adulteration of their products have been inserting an inner seal in their containers, which seal cannot be removed without destructive effort, therefore, when a customer purchases the product he is advised by the destroyed inner seal that the product has been adulterated. The difficulty experienced with the inner seal, prior to my invention, is the inability to insert and secure the inner seal rapidly enough to make it commercially practical from the standpoint of cost.

The primary object of my invention is to provide a new and novel seal inserting and securing attachment which may readily be set over the regular container closure machine conveyor with intermittent feed; and with this and other objects in view my invention consists of the parts and combination of parts hereinafter described.

In the drawings:

Figure 1 is a front elevation of a standard capping machine with my invention embodied.

Figures 1a and 1b are detail sections showing the action of parts of a latching and unlatching means.

Figure 2 is an enlarged detail view of my attachment with associated parts of the standard machine.

Figure 3 is an enlarged detail view showing the operating cams and associated parts.

Figure 4 is a top plan view of the seal feeding element and associated parts.

Figures 5 and 6 are top plan views of the seal feeding element, Figure 5 showing a seal being fed to the element, and Figure 6 showing the seal advanced.

Figure 7 is a vertical longitudinal sectional view of Figure 5.

Figure 8 is a vertical longitudinal sectional view of Figure 6.

Figure 11 is a detail view showing operation of cam and associated parts feeding an inner seal toward a container.

Figure 12 is a view similar to Figure 11 showing a cam in its operation of inserting an inner seal into a container.

Figure 13 is a view similar to Figure 11 showing the cam operation of sealing or locking the inner seal to the container.

Figure 14 is a view of the clutch latch and its controlling means and showing the latch in the position it occupies when the latch is in release position and the clutch is in engaging position.

Figure 15 is a view of the sliding plate of the latch mechanism shown in Figure 14.

Figure 9:
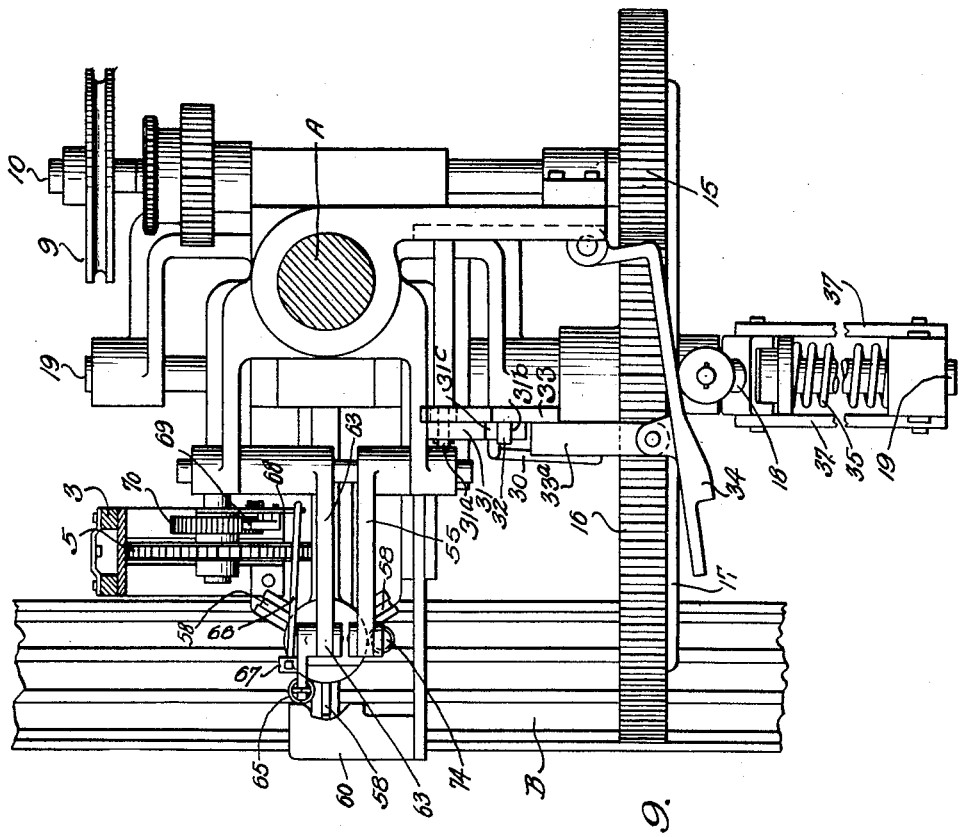
Figure 9 is a top plan view of Figure 2.

While I have shown the tool, per se, that upsets the metal of the inner seal, as embodied in this attachment, it will be understood that this tool may be embodied as a hand tool for this purpose.

The reference letter A designates a support for my attachment which is conveniently located with reference to a standard capping machine to hold the attachment over a standard container conveyor B of the machine, said conveyor usually being of the endless belt type, said conveyor usually being intermittently operated.

The cam 1 is designed to be attached to the standard capping or closure machine, and operated by driving means (not shown) acting on its shaft 1a so as to be timed to make one revolution for each container fed through the closure machine.

The inner seal or cap feeding hopper 2 is of standard size and make, and is provided with a suitable delivery chute 3, the seals being agitated in the hopper by suitable means operated by the gear wheel 4, the seals moving by gravity into the chute 3 with the flange end of the seal positioned toward the support A, said seals being advanced from the mouth of the chute by means of the toothed wheel 5. A suitable motor 6 is supported on the standard A and is provided with a drive pulley 7 carrying a drive belt 8 which in turn engages a pulley 9 mounted on the shaft 10 on which is a pinion 11 which meshes with a pinion 11a on a stub shaft, which pinion 11a is connected by the belt 12 to a toothed wheel on shaft 13 which operates pinion 14 in engagement with the gear 4.

On the other end of the shaft 10 is keyed a pinion 15 (see Figure 9) which drives gear 16, which is provided with a disc clutch 17, which when not restrained by the lever 18 drives the shaft 19, on which cams 20, 21, 22, are keyed, said shaft being also provided at its other end with an eccentric 23. The operation is so designed as to cause one revolution of the shaft 19 and insertion of a seal for every revolution of cam 1, and consequently for every container passing through the closure machine. As the cam 1 makes a turn the depression 24 moves under the roller 25 and the spring 26 pulls the rod 27 back causing the hook 28 to pull lever 29 which through the rod 30 pulls down latch 31 from behind the stop roller or pin 32 on plate 33. Plate 33 is pivoted at one end to the segment 34, as at 33ª, and is slotted at its opposite end, as at 31', for passage of the pivot pin or stud 31ª of the latch 31, whereby the plate is slidably mounted in the direction toward and from the segment 34 and coupled to the segment to swing the latter outwardly and inwardly in such sliding movements of the plate. Latch 31 is provided at its free end with a shoulder 31ᵇ to engage the roller 32 and a beveled or cam face 31ᶜ above the shoulder and intersecting the same for coaction with the shoulder 31ᵇ and the roller 32. When latch 31 is in its down or release position, as shown in Fig. 14, shoulder 31ᵇ is out of engagement with roller 32 and the cam face 31ᶜ lies below the roller, in which position of the latch the plate 33 and segment 34 are retracted under pressure of spring 35 and spring 35 forces clutch 17 into engaging position. When, on the other hand, latch 31 moves upward to locking position its cam face 31ᶜ engages roller 32 and thereby forces plate 33 and segment 34 outward, moving thereby lever 18 outward, and releasing clutch 17 against resistance of spring 35, and the parts are then locked in this position by engagement of latch shoulder 31ᵇ with roller 32, as shown in Fig. 15. The lever 18 is pivoted at 36, while its lower end is pivoted to the plates 37 which in turn are keyed to the shaft 19, the spring 35 being on the shaft 19 between these plates. As the latch 31 is moved from engagement with the stop 32 the segment 34 moves from engagement with the lever 18 allowing the clutch to close and cause the shaft 19, lever 18 and eccentric 23 to turn, the eccentric 23 forcing the rod 38 downward through opening in bracket 39ª on rod 27, causing the collar 39 to push the rod 27 downward against the tension of spring 40, from the position shown in Figure 1ª to the position shown in Figure 1, and unhooking the lever 29 from the latch hook 28, on rod 27, whereupon spring 72 being released from the tension of spring 26, (the latter being the stronger) will pull up the latch 31 behind the stop 32, in which action a beveled or cam face 31ᵇ will engage stop 32 and slide plate 33 outward and return segment 34 to normal position, at the same time bringing the stop into position to be engaged by the shoulder of the latch. As the lever 18 again comes into contact with the segment 34 it will force open the clutch and stop shaft 19 until the latch 31 is again pulled down. Spring 40 is fastened at its ends to bracket 39ª and collar 41. When eccentric 23 is again on top of revolution, spring 40 will contact and force the rod 27 up to bring latch 28 again into engagement with the lever 29 so that when the roller 25 again engages the depression 24 of cam 1 the hook 28 will again be in position to pull lever 29.

*Operation of inserting machine*

Seals 42 are fed from the hopper 2 through chute 3, and are forced from the lower end of the chute by means of the toothed gear 5, and pass with flanged end uppermost through the opening 43 between the jaws 44 and in front of the lug 45. With the seal in this position the movable jaws 44 move backward separating seals 46 and 47, and force seal 46 into the curved sections 48. When the jaws 44 are in their rearward position they are closed by the springs 49 with the seal 46 firmly held between the jaws. The jaws now move forward carrying the seal 46 forward to the position marked 46ª, the pivoted detent 50 being forced by the springs 51 down behind the seal and holding it in this position while the jaws 44 again move back, and opening and closing and firmly gripping the seal. The seal is now in the position shown at 46ᵇ, and now moves forward under a seal engaging projection, member or seat 52ª at the bottom of the inserter head 52 (see Figure 7). The inserter now moves down and its seat enters the seal (see Figure 8). As the inserter 52 moves downward the sleeve 53 is stopped by the cam 21, lever 55 and link 56. As the inserter 52 moves downward, and the sleeve 53 remains stationary, the roller 57 attached to the sleeve causes the upper ends of the levers 58 to move on their pivots 58ª toward the sleeve 53 whereby the lower ends of the levers carrying the upsetting lug 59 are forced outward and radially from the inserter, but with not enough force to deform the seal at first, but with only sufficient force to grip the seal and hold it while the jaws 44 move back leaving the seal on the end of the inserter. As the jaws 44 move back so does the guide 60 which centers the container 61 under the inserter 52.

The inserter 52 now moves down under the influence of the cam 20, lever 63, link 64, spring 65, forcing the seal into the opening of the container. As the inserter 52 comes down the rod 66 is forced down by collar 67, and operates the arm 68 which carries the pawl 69, and thus moves the pawl to a new position on the ratchet drum 70. The sleeve 53 now moves upward and through the rollers 57, draws the upper ends of the levers 58 closer to the sleeve whereupon the deforming lugs 59 are moved to the limit of their outward movement and upset or deform the seal to form lugs 70ª on the seal, which lugs project under the flange 71 of the closure, from which it will be seen that the seal 42 cannot be removed from the container without destroying it. The sleeve 53 now moves down and rests on the lugs 73 and under the influence of spring 74 forces the levers 58 to move outward, thus withdrawing the lugs 59 from the depressions formed by the upset metal (70ª), whereupon the inserter is free to rise out of the seal and releasing the sealed container to be moved forward on the conveyor B.

As the inserter rises it moves the lever 63, which carries the guide 67, which results in the compression of the spring 71ª this compression being held until the jaws 44 again move outward with a seal and at the same time opening 43 moves in front of the feed wheel 5, when the seals will be forced to enter said opening 43.

While I have shown the movement of one seal, there will be a seal in each successive step, as shown, and every outward movement of the jaws 44 a seal will be in the position indicated by 46ᶜ.

The latch 31 is normally held in closed position by the spring 72.

Referring more particularly to Figures 11, 12 and 13, it will be seen that the inserter 52 is (Figure 11) in position to engage a cap, and the inserter (Figure 12) is moved by means of the cam 20 operating the lever 63, then the cam 21 moving to the position shown in Figure 13, operates the lever 55 which through its link pulls the sleeve 53 up and through its rollers 57, forces the upper ends of the arms 58 toward the sleeve and moves the lugs 59 against the side wall of the cap and upsets the metal of said wall and forms lugs 70ª under the flange 71 of the container.

The cam 22 has a cam groove 22ª in which the roller 22$^b$ operates, said roller being carried by the crank lever 22$^c$, the lower end of which engages the block 22$^d$ on which the jaws 44 are mounted, said jaws being normally exerted toward each other by the springs 49.

The block 22$^d$ is pulled to the position shown in Figure 6 by the lever 22$^c$ acting on the spring 60$^a$ through the pin 60$^b$.

The conveyor B may be constantly operated and the containers intermittently fed.

The spring 65 after forcing the seal into the neck of the container holds the seal in place while the lugs 59 deform the seal.

As shown in Figures 2, 4, 5 and 6, I provide a finger 75 secured by the screws 76 in position on the support of the lug 50. The purpose of this finger is to engage the outer jaw 44 to hold the jaws 44 stationary when in the outermost position, shown in Figure 4, so that when the gear wheel 5 forces in a new seal the jar of such action will not force the jaws 44 open and cause cap in position 46$^b$ (Figures 4 and 7) to fall out. The outer jaw 44 is provided with a lug 77 cooperating with the finger 75.

The lugs 50 are provided with the depending portion 50$^a$ which functions to hold the seal down, as shown in Figures 7 and 8, and said lug 50 is also provided with a lip 50$^b$ to hold the cap from accidentally shooting out between the jaws.

Figure 10:
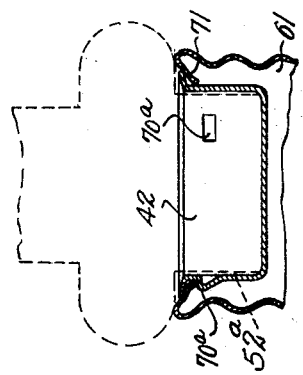
Figure 10 is a detail sectional view showing an inner seal locked in the spout of a container.

As shown in Figure 10 the inserter 52 is resting on the neck of the container which is used as a stop so that spring 65 can be made strong enough to force the seal completely in the neck of the container.

The enlargement near the lower end of the inserter is in effect an annular flange around the inserter which acts as a stop to contact with the top of the neck of the container to prevent the inserter from inserting the seal completely within the container.

The purpose of providing means for unhooking the latch 28 of lever 27 from the lever 29, and re-establishing such connection at proper times, is to secure a timed operation of the seal applying mechanism on the bringing of a receptacle into sealing position, and to prevent operation of the sealing means when no receptacle is in sealing position, or in the event there should be an arrest of motion of a receptacle in sealing position after one seal has been applied thereto. The hooking and unhooking or locking and unlocking lever 27, being controlled by the timer cam 1, which may be driven by suitable driving means acting on its driving shaft 1$^a$, the operation of the sealing mechanism is limited to one seal applying action or cycle for each revolution of cam 1, and consequently for each container feed up motion. Were it not for this unhooking or unlocking arrangement, if cam 1 should stop with the roller 25 in the depression 24, spring 26 would pull lever 27 and through hook 28, lever 29 and rod 30, would pull down latch 31 from behind roller 32 and would hold it down, allowing segment 34 to swing back, so that segment 34 would not support lever 18 and open the clutch, and consequently the inserter machine would continue to run while the closure machine would not be feeding containers to sealing position, and accordingly the inserter machine would apply a plurality of seals in succession to a single container. With the unlocking arrangement above described, if cam 1 stops with the roller 25 in depression 24 the inserter or sealing machine on making one complete revolution, cycle or applying action will stop, eccentric 23 being on main shaft would make one revolution, rod 38 being pivoted off center would move down and collar 39 would push lever 27 and unhook latch 28 from lever 29. This would allow spring 72 to pull up latch 39 behind roller 32 and force out segment 34, with the result of operating lever 38 to disengage the clutch and stop the operation of the inserter or seal applying machine. As eccentric 23 finishes its revolution rod 38 will be raised and collar 41 elevated to compress spring 40, lever 27 being at this time at the left hand end of its reciprocating movement, so that latch 28 will lie in contact with the end of the lower arm of lever 29 which will be swung backward from its normal position shown in Figure 1, thus preventing lever 28 from being drawn upward to latching position by spring 40. When the closure machine operates cam 1 and depression 24 of the cam moves out of engagement with the roller 25, lever 27 will be moved forward to a point in advance of the lower arm of lever 29 and will be drawn into engagement therewith by the action of the spring 40, thus resetting the latch 28 in position to operate rod 30 and withdraw latch 31 from engagement with the roller 22 on the next revolution of the cam 1.

What I claim is:

1. In combination, in a device for sealing containers, a pair of movable members, means to feed seals to said members, means to feed said seals between said movable members, an inserter to engage the seal and insert it into a container, and means carried by the inserter to upset the seal into interlocking engagement with the container to prevent its removal without destructive effort.

2. In combination, in a device for sealing containers, a pair of movable members, means to feed seals to said members, means to feed said seals between said movable members, an inserter to engage said seal, means to engage the seal and insert it into a container, means to hold the container in position to receive the seal, and means carried by the inserter to upset the seal into interlocking engagement with the container to prevent its removal without destructive effort.

3. In combination, in a container sealing machine, a combined seal inserter and upsetting element; said element comprising a shaft having a seat on its lower end to receive and hold a seal thereon, levers pivoted to said shaft adjacent said seat, a sleeve slidably mounted on said shaft, means on the sleeve to engage said levers and move the levers on their pivots to swing the lower ends of the levers outward from said seat when the sleeve is moved away from said seat.

4. In combination, in a container sealing machine, a combined seal inserter and upsetting element; said element including a shaft, a seal seat at the bottom of the shaft, upsetting levers pivoted to said shaft adjacent said seat, a sleeve movably mounted on said shaft, guides on said sleeve in which the upper end of said levers move, and means in said guides to engage and move said levers when the sleeve is moved relatively to the shaft, to throw the lower ends of the levers beyond the perimeter of the said seat.

5. In combination, in a container sealing machine, means for securing a seal in the container so that it cannot be removed without destructive effort, said means including jaws to receive and move the seal to operative position relative to a container, means to hold a container in position to receive the seal, an inserter to insert the seal into the container, and means carried by the inserter to distort the seal after it is in the container.

6. In combination, in a container sealing machine, means for securing a seal in the container so that it cannot be removed without destructive effort, said means including jaws to receive and move the seal to operative position relative to a container, means to hold a container in position to receive the seal, an inserter to insert the seal into the container, means carried by the inserter to distort the seal after it is in the container, and timed cams to operate the jaws, inserter and distorter.

7. In a container seal applying machine adapted to be employed in conjunction with a closure applying machine having a container feed device for feeding containers successively to sealing position, means for feeding up a seal, inserting the seal in the container and interlocking the seal with the container, operating means for said seal feed up, inserting and interlocking means, a timer, and means governed by the timer for starting and stopping said operating means.

8. In a container seal applying machine adapted to be employed in conjunction with a closure applying machine having a suitably driven container feed device for feeding containers successively to sealing position, means for feeding up a seal, inserting the seal in the container and interlocking the seal with the container, operating means for said seal feed up, inserting and interlocking means, and a time-controlled governing device, and means controlled thereby for rendering said seal feed up, inserting and interlocking means operative or inoperative by said operating means.

9. In a container seal applying machine adapted to be employed in conjunction with a closure applying machine having a suitably driven container feed device for feeding containers successively to sealing position, means for feeding up a seal, inserting the seal in the container and interlocking the seal with the container, operating means for said seal feed up, inserting and interlocking means, a time-controlled cam, and means controlled by said cam for rendering said seal feed up, inserting and interlocking means operative or inoperative by said operating means.

10. In a container seal applying machine adapted to be employed in conjunction with a closure applying machine having a suitably driven container feed device for feeding containers successively to sealing position, means for feeding up a seal, inserting the seal in the container and interlocking the seal with the container, operating means for said seal feed up, inserting and interlocking means, a clutch device for throwing said operating means into or out of action, a timing cam, and means controlled by the cam for rendering said clutch device operative or inoperative.

11. In a container seal applying machine adapted to be employed in conjunction with a closure applying machine having a suitably driven container feed device for feeding containers successively to sealing position, means for feeding up a seal, inserting the seal in the container and interlocking the seal with the container, a drive shaft, operating elements carried by said shaft for actuating the seal feeding, inserting and interlocking means in proper order, a driving mechanism, a clutch device for throwing said driving mechanism into and out of action, and a controller for periodically throwing said shaft into and out of operation to effect the operation of the seal feeding, inserting and interlocking means when a container is in sealing position and once only while the same container occupies such position.

12. In a container seal applying machine adapted to be employed in conjunction with a closure applying machine having a suitably driven container feed device for feeding containers successively to sealing position, means for feeding up a seal, inserting the seal in the container and interlocking the seal with the container, a drive shaft, operating elements carried by said shaft for actuating the seal feeding, inserting and interlocking means in proper order, a driving mechanism, a clutch device for throwing said driving mechanism into and out of action, a control cam, and means governed thereby for controlling the action of the clutch device.

13. In a container applying machine, a recessed seal engaging and inserting member, a punch carried by said member and having an acting portion mounted for movement into and out of said recess, and means operative on the insertion of the seal to project the acting portion of the punch and cause the same to displace a portion of the seal for interlocking engagement with the container.

14. In a container sealing machine, a pair of reciprocatory jaws to receive and advance the seals, means coacting with the jaws to advance the seals between the jaws to sealing position, a stop to prevent movement of one of the jaws during the feed of a seal into said jaws, an inserter to insert the seals in the container having a portion to enter the seal and to be inserted with the entire seal in the neck of a container, a stop on the inserter above said flange to contact with the rim edge of the neck of the container to prevent the inserter from forcing the seal within the container body, and means carried by said inserter for mechanically interlocking the seal with the container neck wholly inside said neck.

15. In a container seal applying machine adapted to be employed in conjunction with a closure applying machine having a container feed device for feeding containers successively to sealing position, means for feeding up a seal, inserting the seal in the container and displacing portions of the seal and interlocking the same with the neck of the container wholly inside said neck, operating means for said seal feed up, inserting and interlocking means, a timer, and means governed by the timer for periodically starting and stopping said operating means.

16. In a container sealing machine, a pair of reciprocating jaws to receive and advance the seal, spring means for holding said jaws closed, a stop, means for introducing a seal between the jaws and in front of said stop and moving the seal forward by the jaws, a detent to engage an advanced seal and hold the same in such position and in spaced relation to a succeeding seal disposed between the same and the stop, and means to apply the advanced seal to the container.

17. In a container sealing machine, a pair of reciprocating jaws to receive and advance the seal, spring means for holding said jaws closed, a stop, means for introducing a seal between the jaws and in front of said stop and moving the seal forward by the jaws, a detent to engage an advanced seal and hold the same in such position and in spaced relation to a succeeding seal disposed between the same and the stop, means to apply the advanced seal to the container, a support carrying the jaws, a crank lever carrying a roller engaging the support, a spring acting on the lever to yieldingly hold the same in engagement with the support, and a cam for actuating the lever.

18. In combination, in a container sealing machine, means for moving a container to sealing position, means to insert a seal in said container and upset the metal of the seal within the container and interlock the seal with the container, operating means for said seal inserting and upsetting means, a timer, and starting and stopping means governed by the timer and comprising parts automatically locked and unlocked for periodically starting and stopping said operating means.

19. In combination, in a container sealing machine, means for bringing a container and a seal into sealing position, means to insert a seal into said container and interlock the seal with the container, operating means for said seal inserting and upsetting means, a timer, and starting and stopping means governed by the timer for periodically connecting the seal holding and seal applying and upsetting means with and disconnecting the same from said operating means.

20. In combination, in a sealing device for containers, means to move a seal to sealing position, means holding the seal in sealing position, an inserter to introduce the seal into a container, means to upset the seal inside the container into interlocking relation to the container, operating means for said inserter and upsetting means, a timer, and starting and stopping means governed by the timer for periodically connecting the inserter and upsetting means with and disconnecting the same from said operating means.

ADOLPH G. SCHURMAN.